J. COYLE.
NUT LOCK.
APPLICATION FILED MAY 21, 1912.

1,040,516.

Patented Oct. 8, 1912.

Witnesses

Inventor
James Coyle
By
Attorney

UNITED STATES PATENT OFFICE.

JAMES COYLE, OF TREMONT, PENNSYLVANIA.

NUT-LOCK.

1,040,516.  Specification of Letters Patent.  Patented Oct. 8, 1912.

Application filed May 21, 1912. Serial No. 698,749.

*To all whom it may concern:*

Be it known that I, JAMES COYLE, a citizen of the United States, residing at Tremont, in the county of Schuylkill and State of Pennsylvania, have invented a new and useful Improvement in Nut-Locks, of which the following is a specification.

This invention relates to that type of nut locks in which the lock is carried by the nut, and includes means for releasing the lock so that the nut can be removed from the bolt.

Figure 1:
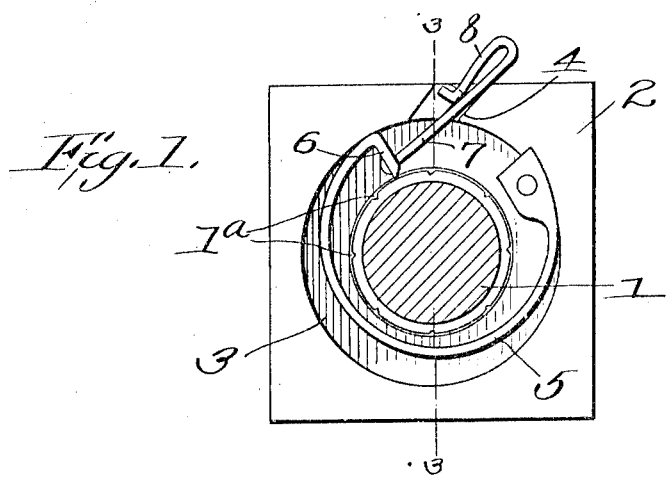
Figure 2:
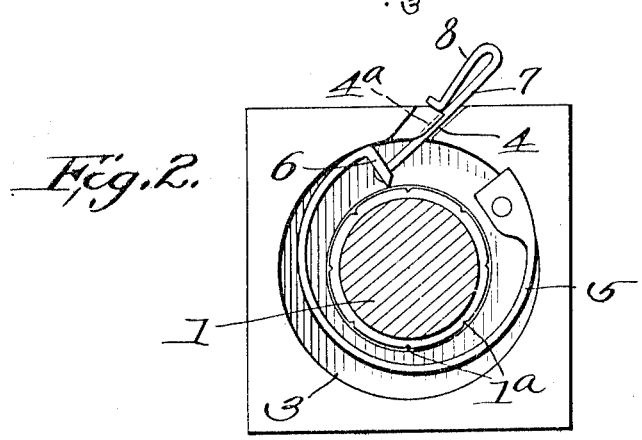
Figure 3:
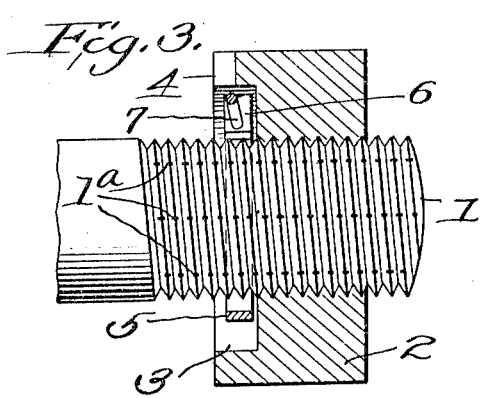
Figure 4:
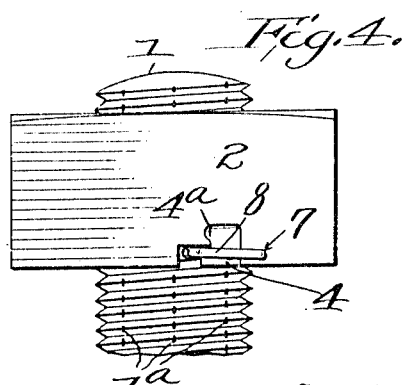

The invention consists of the novel features of construction hereinafter described, pointed out in the claims and shown in the accompanying drawings, in which, Figure 1 is a view of the inner face of a nut provided with my locking device, parts being shown in locking position and a bolt being shown in cross section. Fig. 2 is a similar view the parts being shown in unlocked position. Fig. 3 is a transverse section through the nut upon the line 3—3 of Fig. 1. Fig. 4 is a side view.

In these drawings 1 represents a bolt of the usual type and 2 a nut which upon one face is provided with an annular recess 3 surrounding the usual bolt opening. Upon one side of the nut the wall of this recess is slotted as shown at 4. Within said recess and adjacent said slot is secured an end of a semi-circular spring 5. The opposite end of said spring is bent inwardly as shown at 6 and forms a locking pawl of sufficient width to always engage a bolt thread. Secured to said pawl is a pull wire 7, said wire extending outwardly through the slot 4. The outer portion of the wire is bent back upon itself, and then curved slightly so that when the same is lifted it will ride over one edge of the slot and rest upon the outer face of the nut, as shown in Fig. 2. The loop 8 thus formed by bending the wire 7 back upon itself serves therefore the double purpose of a handle by means of which the pawl 6 can be drawn out of engagement with the bolt threads and it also serves as a locking means holding said pawl out of engagement with the threads of the bolt as long as the curved outer end of the loop is in engagement with the exterior face of the nut. By pushing this curved end back into the slot 4 the pawl 6 will again spring into engagement with the bolt threads and while the nut will turn freely to tighten it, it cannot be turned in the reverse direction, that is to loosen it, until the pawl has been drawn out of engagement with the bolt. It will be noted that the slot 4 communicates with a pocket 4ᵃ and the shoulder thus formed is provided with a beveled edge upon which the angled end portion of the loop 8 rides when the nut is to be unlocked from the bolt. I also preferably notch the threads of the bolt at suitable intervals as shown at 1ᵃ, thereby enabling the pawl to tain a positive hold upon said bolt, thus making a positive lock.

What I claim is:

1. The combination with a threaded bolt, of a nut adapted to work thereupon, said nut having an annular recess surrounding the bolt opening and having a slot leading from said recess to the outer face of one side of the nut and having a shoulder therein, a spring secured in said recess and having an end bent to engage the bolt threads, and a pull member having one end secured to said pawl and the other end bent back upon said pull member, said pull member projecting through the said slot and adapted to be brought into engagement with said shoulder for the purpose of holding the pawl out of engagement with the bolt.

2. A nut lock comprising a threaded bolt, a nut having one face recessed, a spring seated in said recess, said spring partially encircling said bolt, and having one end bent to form a pawl of sufficient width to always engage a thread of the bolt, said nut having a slot opening through one side of the nut and communicating with said recess and a pull member working through said slot and secured to said pawl.

3. The combination with a threaded bolt of a nut recessed upon one face, and having a slot extending through one side of the nut into said recess, said slot communicating with a pocket, a beveled shoulder forming one side of said pocket, a spring secured in the recess and having an angled end portion adapted to engage the threads of the bolt, and a pull member connected at one
5 end to said pawl said pull member extending through said slot and being adapted to move into said pocket and to engage said shoulder, said pull member when in engagement with the shoulder drawing the pawl away from the bolt.

JAMES COYLE.

Witnesses:
M. J. FLEMING,
E. J. POWER.

Copies of this patent may be obtained for five cents each, by addressing the "Commissioner of Patents, Washington, D. C."